United States Patent [19]
Kostas

[11] 3,797,599
[45] Mar. 19, 1974

[54] PUMP DRIVE FOR HYDROSTATIC DRIVE LOADERS

[75] Inventor: James M. Kostas, Peoria, Ill.

[73] Assignee: Caterpillar Tractor Co., Peoria, Ill.

[22] Filed: Dec. 22, 1971

[21] Appl. No.: 210,779

[52] U.S. Cl. .............................. 180/53 R, 180/66 R
[51] Int. Cl. ............................................ B60k 17/28
[58] Field of Search...... 180/66 R, 53 R, 53 D, 6.48

[56] References Cited
UNITED STATES PATENTS

| | | | |
|---|---|---|---|
| 2,996,135 | 8/1961 | Grabow | 180/66 R |
| 3,104,528 | 9/1963 | Horig | 180/53 R |
| 3,616,869 | 11/1971 | Rilling | 180/6.48 |
| 2,468,828 | 5/1949 | Kopp | 180/66 R |
| 3,709,312 | 1/1973 | McGough | 180/66 R X |

Primary Examiner—Gerald M. Forlenza
Assistant Examiner—George F. Abraham
Attorney, Agent, or Firm—Fryer, Tjensvold, Phillips & Lempio

[57] ABSTRACT

A vehicle driven by hydrostatic motors includes a removable compartment in an accessible location remote from the vehicle engine which contains swivel disc pumps, and shafts and gears driving the pumps, arranged to be driven by the vehicle engine. The shafts are supported on bearings disposed in pillow blocks for easy removal from the compartment.

An implement pump is also mounted on the compartment wall to be driven by a common drive shaft with the pumps, allowing the implement pump to utilize maximum engine power when required.

7 Claims, 4 Drawing Figures

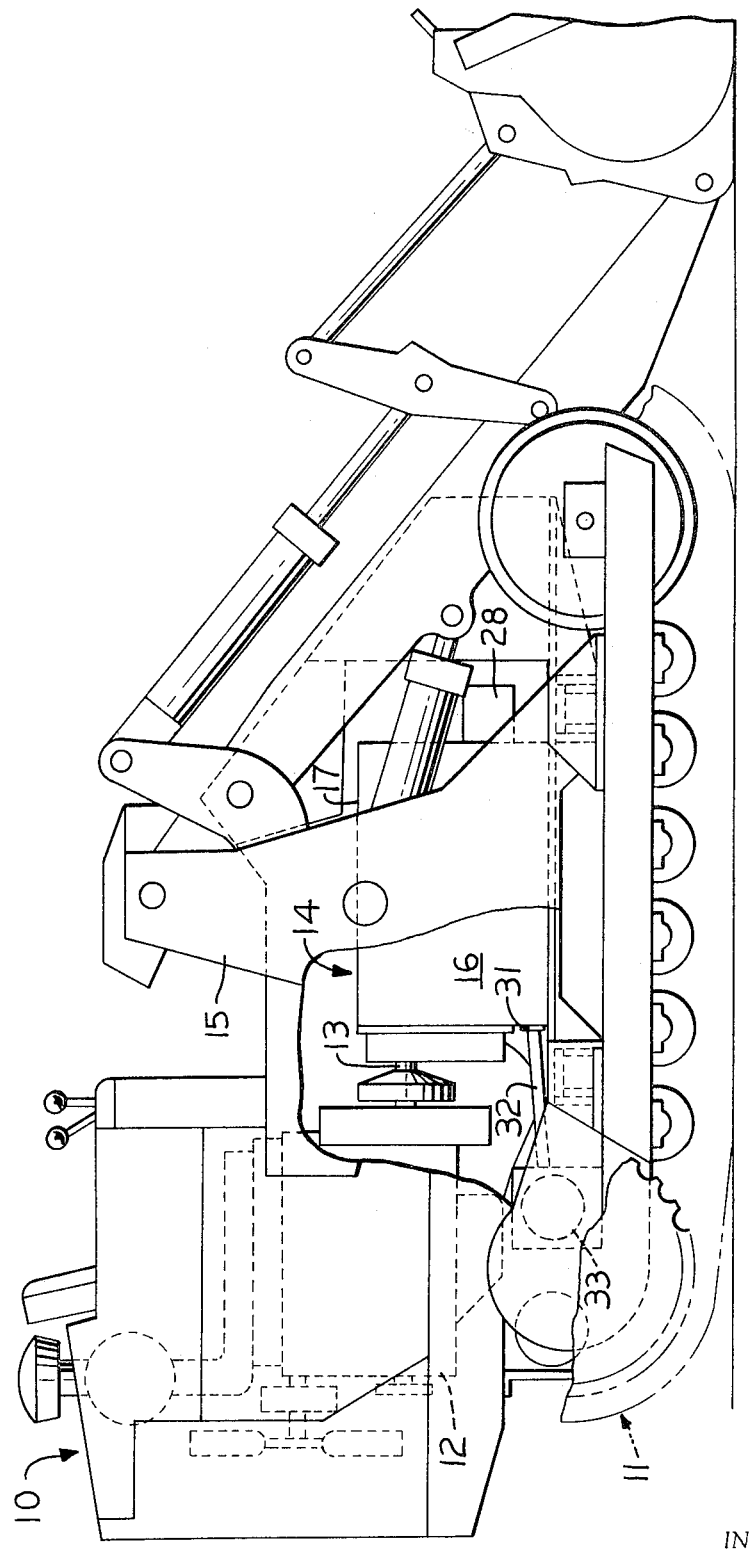

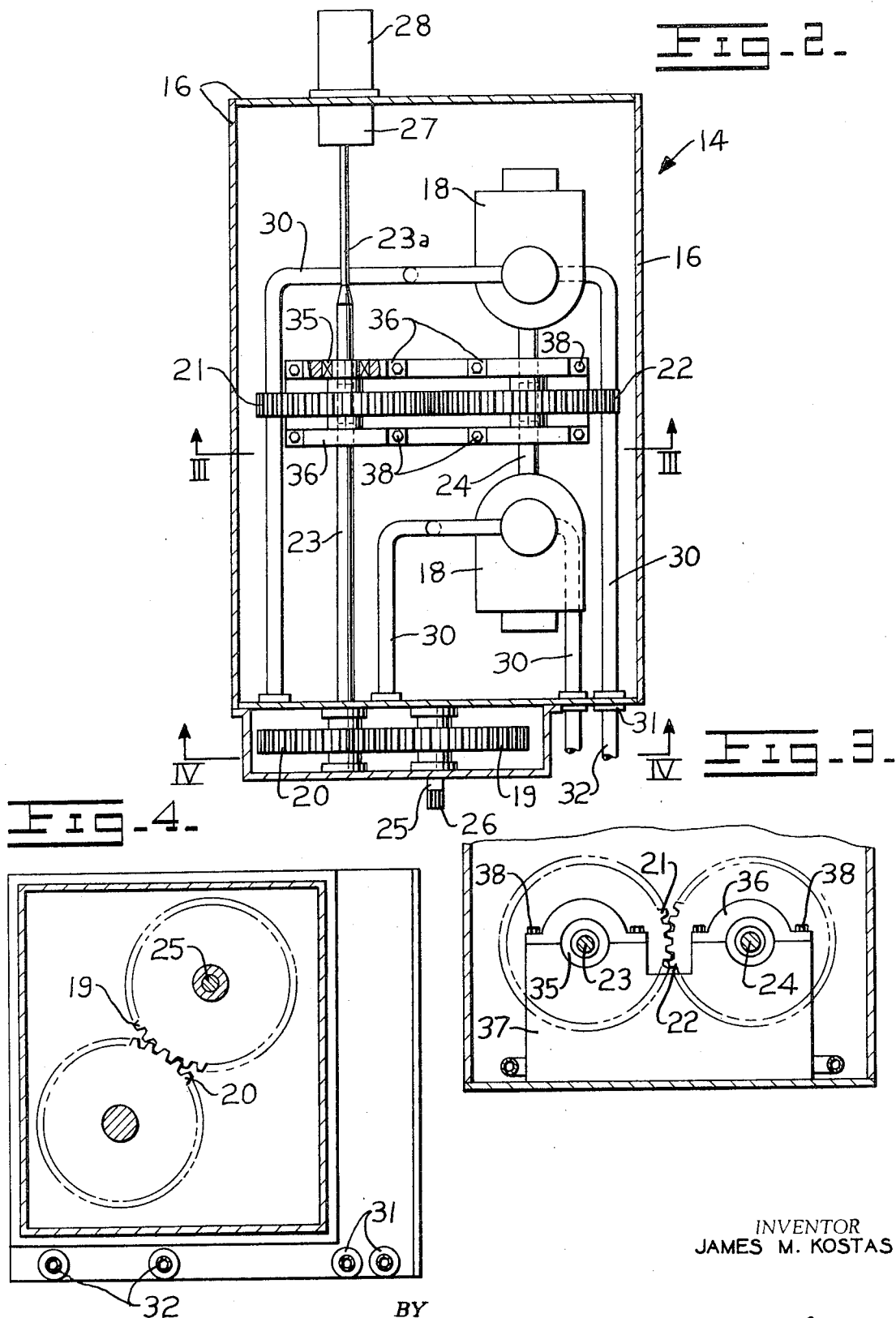

3,797,599

PUMP DRIVE FOR HYDROSTATIC DRIVE LOADERS

BACKGROUND OF THE INVENTION

This invention relates to a hydrostatic drive train for a vehicle, and more particularly to the mounting and drive arrangement of the hydrostatic pumps employed in the hydrostatic drive transmission. In the past, efforts to employ a hydrostatic drive on a vehicle have been directed toward simply replacing the conventional drive transmission of the vehicle with a hydrostatic drive. As a result, the hydrostatic pumps, motors and controls were located in a modified final drive case where they were inaccessible for adjustment and servicing.

SUMMARY OF THE INVENTION

It is accordingly an object of the present invention to provide a non-complex and economical hydrostatic drive system for a vehicle in which the hydrostatic pumps are easily accessible and removable for servicing and adjustment. The present invention provides a drive train from the vehicle engine to a compartment, located in an otherwise open and easily accessible part of the vehicle and mounting the hydrostatic pumps and gearing therefor. The pumps are mounted in the compartment by means which allow for expeditious removal of the pumps from the compartment. This arrangement also provides for driving both the hydrostatic drive pumps and vehicle implement pumps by one drive shaft, allowing the implement pumps to utilize maximum engine power when required.

BRIEF DESCRIPTION OF THE DRAWING

In the Drawings:

FIG. 1 is a partially sectioned side elevational view of a loader vehicle employing a hydrostatic transmission therein;

FIG. 2 is a sectioned top plan view of a hydrostatic pump drive train for such transmission, embodying the present invention;

FIG. 3 is a sectional view taken along line III—III in FIG. 2; and

FIG. 4 is a sectional view taken along line IV—IV in FIG. 2.

DETAILED DESCRPITION OF THE PREFERRED EMBODIMENT

Referring to FIG. 1, a track type loader vehicle includes a frame 10 mounted on ground-engaging endless tracks 11. A rear mounted engine 12 has a drive shaft 13 extending forwardly into a hydrostatic drive pump compartment or housing 14, mounted between frame members 15 which support the vehicle's loader linkage and lift arms. It will be noted that although the pump compartment 14 is located between frame members 15, it is easily accessible from above and from the front of the vehicle.

The compartment includes upstanding walls 16, and a cover 17 which is easily removed to expose hydrostatic pump drive train components housing the compartment, for servicing and adjustment thereof. Referring to FIG. 2, such components comprise a pair of swivel-type reversible and variable displacement pumps 18 driven by a gear train. The gear train comprises a first pair of meshing gears 19 and 20, a second pair of meshing gears 21 and 22, a drive shaft 23 connecting gear 20 to gear 21, and a shaft 24 connecting gear 22 to pumps 18.

A stub shaft 25, keyed to gear 19, has a splined end 26 adapted to receive shaft 13 (FIG. 1) in driving engagement therewith. A shaft 23a connects gear 21 to a replenishing pump 27, mounted within compartment 14, and an implement pump 28 mountd outside the compartment. Since a common drive shaft is used to drive both the hydrostatic drive pumps as well as pumps 27 and 28, maximum horsepower from the engine can be utilized by the implement pump when required.

Fluid conduits 30 connect the pumps 18 to outlets 31 (FIG. 4) in the compartment walls adapted for connection with fluid pipes 32 (FIG. 1) communicating with hydrostatic drive motors 33 of the vehicle. Thus, upon disconnecting drive shaft 13 from shaft 25 and pipes 32 from outlets 31, the entire compartment 14, including the gearing and pumps mounted therein may be removed as a unit from the vehicle to a workbench for maintenance and repair.

Referring again to FIGS. 2 and 3, gears 21 and 22 are supported in bearings 35, disposed within pillow blocks 36 which are, in turn secured to upstanding brackets 37 by bolts 38. A similar bearing arrangement, not shown, supports the gears 19 and 20. Although the shafts may be mounted in the bearings with the gears being supported by the shafts, it has been found that alignment of the gears is better with the present arrangement. Pumps 18 are conventionally secured within compartment 14 by a plurality of bolts, not shown. Upon removing those bolts and bolts 38 and disconnecting conduits 30 from the pumps, both pumps can be easily removed from the compartment for servicing.

I claim:

1. A vehicle comprising a frame, ground-engaging means for propelling the vehicle over the ground, an engine mounted on the frame and having a drive shaft extending therefrom, hydrostatic motor means for driving the ground-engaging means, conduit means communicating with the hydrostatic motor means, a removable hydrostatic drive pump compartment structure removable mounted on the frame, hydrostatic pump means disposed on said pump compartment structure, mechanical drive means disposed on said pump compartment structure for driving said hydrostatic pump means, said mechanical drive means comprising a first pair of meshing gears, a second pair of meshing gears, a gear drive shaft extending from one of said first pair of meshing gears to one of said second pair of meshing gears for driving the same, a pump drive shaft keyed to another of said second pair of meshing gears and driving the hydrostatic pump means, and a stub shaft connected to and driving said first pair of meshing gears and extending from said pump compartment sructure, for connection with the engine drive shaft so that the vehicle hydrostatic pump means and the drive means therefor can be removed as a single unit from the vehicle.

2. The combination of claim 1 wherein said hydrostatic pump means comprises a pair of swivel-type reversable and variable displacement pumps driven by a common drive shaft.

3. The combination of claim 1 further comprising upstanding brackets, pillow blocks mounted on the brackets, and bearings disposed in the pillow blocks and wherein said meshing gears are rotatably supported in said pillow blocks.

4. The combination of claim 1 further comprising an implement pump mounted on the compartment and wherein a shaft extends from said one of said second pair of meshing gears to the implement pump whereby maximum power from the engine can be utilized by the implement pump.

5. The combination of claim 1 wherein the pump compartment structure is a box-like housing mounted on top of the vehicle frame for immediate access thereto.

6. The combination of claim 5 wherein said housing includes a removeable top cover.

7. The combination of claim 5 wherein said vehicle comprises a tractor having said engine mounted at one end thereof and said housing mounted adjacent the engine intermediate the engine and the other end of the vehicle.

* * * * *